3,692,726
Patented Sept. 19, 1972

3,692,726
PROCESS FOR THE PRODUCTION OF AQUEOUS POLYMER DISPERSIONS WHICH ARE SUBSTANTIALLY FREE FROM RESIDUAL MONOMER
Klaus Oehmichen, Wesel, Germany, assignor to Reichhold-Albert-Chemie-Aktiengesellschaft, Hamburg, Postfach, Germany
No Drawing. Continuation-in-part of application Ser. No. 793,886, Jan. 24, 1969. This application Mar. 19, 1971, Ser. No. 126,329
Claims priority, application Germany, Jan. 27, 1968, P 17 45 360.0
Int. Cl. C08l 15/36, 37/14
U.S. Cl. 260—29.6 R        3 Claims

ABSTRACT OF THE DISCLOSURE

A process for the production of dispersions containing polymers or copolymers, practically free from monomers, which are obtained by emulsion polymerization or copolymerization in an aqueous medium in which monomers are used which contain unsaturated acids or their esters such as acrylic acid and/or methacrylic acid or their esters, emulsifiers, water-soluble redox-systems with pH values between 2 and 6 and peroxy compounds the improvement comprising adding peresters and/or perketals to the reaction mixture, the decomposition temperatures of the peresters or perketals being preferably between 30 and 150° C., so that the mixture is polymerized at the polymerization temperature until the residual monomer content becomes negligible.

CROSS-REFERENCE TO A RELATED APPLICATION

Applicant claims priority under 35 U.S.C. 119 for application Ser. No. P 17 45 360.0 filed in the patent office of the Federal Republic of Germany on Jan. 27, 1968.

BACKGROUND OF THE INVENTION

(1) Field of the invention

This is a continuation-in-part of the application Ser. No. 793,886 filed Jan. 24, 1969, and now abandoned.

The present invention relates to a process for the production of aqueous dispersions of polymers which are substantially free from residual monomers and more specifically to the production of such dispersions containing a homopolymer or copolymer of acrylic or methacrylic acid and esterification products of acrylic acid and/or methacrylic acid and an alkanol of 1 to 12 carbon atoms.

The emulsion polymers of acrylic and methacrylic compounds are useful for water-based paint formulations, leather finishing and paper coating.

(2) Prior art

The state of the prior art of acrylic acid and derivatives, methacrylic compounds and peroxy compounds may be ascertained by reference to the Kirk-Othmer "Encyclopedia of Chemical Technology," 2nd Ed., vol. 1 (1963), under the section entitled "Acrylic Acid and Derivatives," pp. 285–313, particularly the subsection describing the preparation of polymers, pp. 305–308, vol. 13 (1967), under the section "Methacrylic Compounds," pp. 331–363, particularly the sub-sections dealing with the uses of the compounds on p. 359, and with polymerization on pp. 345–354, and vol. 14 (1967), under the section entitled "Peroxides and Peroxy Compounds," pp. 746–834, particularly the sub-section concerned with Peroxy Acids (Peracids), beginning on p. 794, Diacyl Peroxides beginning on p. 798 and Peroxy Esters (Peresters), pp. 804–807.

The preparation of perketals is being described in "Journal of Orangic Chemistry," vol. 23, p. 1322, and in "Annalen," vol. 565, p. 7, and in "Helvetica Chimia Acta," vol. 13, p. 142, and in "Journal of the American Chemical Society," vol. 71, p. 1432, and vol. 77, p. 1756.

These references give overall methods for producing the employed peroxides and instructions for polymerizing monomeric compounds but no word was said about reducing the monomer content in the reaction mixture after polymerization.

Processes have already become known in which the residual monomer content in such dispersions is removed by subjecting these dispersions to special distillation processes as described in German published specification 1,248,943, in the U.S. Pats. 3,297,612 and 3,311,676, in the Russian Patent 186,389 and in the Japanese Patent 16/375,166.

In the U.S. Pat. 3,423,353 post-catalysis of the preformed polymer emulsion is employed using persulfates, for example. By this method, however, it is not possible to lower the monomer content substantially, as is shown in comparison test series 1.

SUMMARY

Aqueous dispersions of polymers containing a homopolymer or copolymer of acrylic or methacrylic acid or an esterification product of acrylic or methacrylic acid and an alkanol of 1 to 12 carbon atoms are obtained by emulsion polymerization.

In the previously known emulsions or dispersions of this type there exists the great disadvantage that the dispersions produced after the polymerization contain an amount of residual monomers which frequently restricts the technical usefulness of these products to a substantial extent, since such products possess an unpleasant penetrating odor as a result of the residual monomer content.

It is the principal object of the present invention to reduce the residual monomer content of such dispersions by a chemical post-treatment of the dispersions obtained by polymerization in the presence of conventional redox catalyst systems to a point where this residual monomer content becomes negligible small and can no longer cause objections because of odor.

The polymerization of monomeric compounds which include at least one member selected from the group consisting of acrylic acid, methacrylic acid, alkyl acrylates and methacrylates such as methyl acrylate, ethyl acrylate, n-propyl acrylate, n-butyl acrylate, isobutyl acrylate, 2-ethylhexyl acrylate, methyl methacrylate, ethyl methacrylate, n-propyl methacrylate and isobutyl methacrylate, acrylonitrile, methacrylonitrile, acrylamide, methacrylamide, N-methylolacrylamide, alkylated N-methylolarcylamide such as N-methoxymethylacrylamide and N-butoxymethylacrylamide, vinyl propionate, vinyl butyrate, aliphatic vinyl ether such as methyl vinyl ether, ethyl vinyl ether and n-butyl vinyl ether and alkyl esters of monoethylenically unsaturated dicarboxylic acids, e.g. diethyl maleate, dibutyl maleate, dioctyl maleate, dipropyl maleate, dipropyl fumarate, dibutyl fumarate, dioctyl fumarate and didecyl fumarate, styrene may be carried out by conventional techniques, i.e. by means of emulsion polymerization at a pH value between 2 and 6 in the presence of usual emulsifiers and water-soluble redox systems containing peroxy compounds, see for example the following literature reference: Houben-Weyl, Makromolekulare Stoffe (Macromolecular Substances), I, page 594 ff (year 1961). Peresters and/or perketals are, however, not used in the known processes for the manufacture of emulsion polymers in aqueous media.

According to this invention there is provided a process for the production of an aqueous dispersion of polymers containing a homopolymer or copolymer in which polymerizable unsaturated monomers are used which contain at least one compound selected from the group consisting of acrylic acid, methacrylic acid, acrylic acid esters, methacrylic acid esters, acrylamide, acrylonitrile, methacrylamide, methacrylonitrile or mixtures thereof by emulsion polymerization of a reaction mixture having a pH value of about 2 to 6 and including at least one monomer selected from the group consisting of acrylic acid, methacrylic acid, acrylic acid esters and methacrylic acid esters and a water-soluble, inorganic peroxy compounds containing redox systems, the improvement comprising the addition to the polymerization mixture of 0.1 to 3 percent by weight based upon total monomer content of a treating agent having a decomposition temperature of 30 to 150° C. selected from the group consisting of carboxylic acid esters having the general formula

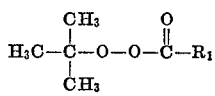

wherein $R_1$ is an alkyl group with 1 to 9 carbon atoms such as -methyl, -ethyl, -n-propyl, -isopropyl, -n-butyl, -isobutyl, -pentyl, -hexyl, -heptyl, -octyl, -nonyl or an aromatic radical such as

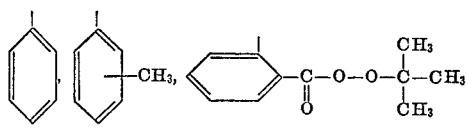

or a carboxylic acid radical, such as

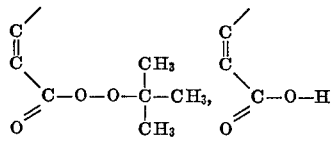

and the perketals having the formula:

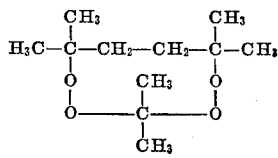

and mixtures of such carboxylic acid esters and perketals to reduce the residual monomer content below 0.01 percent. Acrylic acid and/or methacrylic acid being used in amounts of 1 to 7% by weight relative to the total monomer content employed.

The peresters and perketals which are empolyed according to this invention are not water-soluble and can be employed in the liquid state, using the technical purity of 90 to 98% by weight or, if being solid, in finely dispersed form or in solution in an organic solvent which does not disturb the reaction.

The process of the present invention can be varied out using a dispersion of polymers obtained by conventional polymerization techniques as the starting material, which dispersion having a solid content of about 50 to 75% by weight, preferably 57 to 62% by weight. In this embodiment, the perester or perketal may be added to the polymerized dispersion while it is still in the reaction vessel at the polymerization temperature and the polymerization of residual monomers is carried out in the presence of the perester or perketal coterminously with the main polymerization reaction. Alternatively, it is possible to subsequently treat in accordance with the invention, a pre-formed dispersion of polymers to remove residual monomers by additional copolymerization.

As usable peresters it is, for example, possible to empoly tert.-butyl perbenzoate, tert.-butyl peracetate, tert.-butyl permaleate, tert.-butyl perisononate, tert.-butyl peroctoate, tert.-butyl perpivalate, as well as tert.-butyl esters of pertoluic and perphthalic acids and of per-dimethylalkylcarboxylic acids which contain up to 20 carbon atoms. Among these peresters, tert.-butyl peroctoate and tert.-butyl perisononate are preferentially employed.

In general the peresters and/or perketals are added in amounts of 0.1 to 3 percent by weight relative to the amount of total monomers employed. Adding even higher quantities of peresters and/or perketals does not harm the removal of the residual monomer content but in general endeavors should be made only to add such an amount of perester or perketal that the amount should suffice fully to polymerize the residual monomers, since certain peresters and/or perketals possess an intrinsic odor. In order that emulsions or dispersions of as little an odor as possible should be obtained in the present process, the unreacted peresters or the perketals are destroyed by adding reducing agents of an inorganic or organic nature as soon as the residual monomers have been fully polymerized.

A wide selection of substances is available for use as reducing agents for peroxidic compounds, since the reduction of peroxides, peresters or perketals and the like by addition of reducing agents is in itself known (compare Houben-Weyl/Makromolekulare Chemie (Macromolecular Chemistry) I (1961), pages 495 and 434). Nitrites, sulphites, hydroxylamines, hydrazines and Sn-II compounds are mentioned as examples of suitable reducing agents.

As preferred reducing agents, hydrazine hydrate or its salts with inorganic or organic acids, hydroxylamine as the free base or its salts, gaseous sulphur dioxide or its water-soluble salts and the inorganic salts of nitrous acid with these salts having to be present in acid solution in order to be able to develop their reducing action, are here employed.

In an alternative embodiment of the present invention, the perester or perketal may be added to the emulsion polymerization reaction mixture prior to initiation of the reaction or during the course of the reaction. In this manner of carrying out the process of the invention, the perester or perketal is activated by raising the temperature of the reaction mixture and/or by adding a compound which induces decomposition of the perester or perketal and formation of free radicals when the amount of free monomers has fallen to a substantially constant level.

As mentioned above, where peresters and/or perketals are used which do not decompose at all, or only decompose inadequately at the polymerization temperature in an aqueous medium below the boiling point of water, it is desirable to add, along with the peresters and/or perketals, such compounds that induce the decomposition of the peresters and/or perketals if the polymerization temperature is maintained.

The following compounds are mentioned by way of example of compounds which can be used for this purpose: Vanadyl salts, cobalt-II-salts, and hydrazine. The vanadyl or cobalt salts may be in the form of salts of inorganic or organic acids and are added in amounts of 0.001 to 0.01 percent by weight, calculated as metal content relative to the total amount of monomers employed. The vanadyl and cobalt salts of organic acids, for example vanadyl p-toluene sulphonate, are preferentially employed. The hydrazine or the tertiary amines are used in amounts of 0.05 to 1 percent by weight relative to the total monomer mix.

It is not necessary to wait with the addition of the perester and/or perketal until the residual monomer content in the emulsion polymerization has fallen to an approximately constant low value (approximately 0.2–1% by weight). It is known that in the known processes for the manufacture of homopolymers or copolymers by means of emulsion polymerization in an aqueous system, with acrylic acid and/or methacrylic acid and/or their esters being present among the monomeric compounds, the polymerization towards the end stops at such a point that the residual monomer content is about 0.2–1% by weight or more. Systems which copolymerize relatively easily still contain about 0.3% by weight of residual monomers when the residual monomer content has reached constant value.

It is also possible, when carrying out the process according to the invention, to add the perester and/or the perketal to the reaction mix before initiating the polymerization, but in this case a special selection of the peresters or perketals has to be made so that the peresters or perketals essentially remain preserved during the course of the emulsion polymerization in the presence of redox systems and only become activated when the residual monomer content has established itself at approximately the constant low value, which can, for example, be 0.5% or less.

It can be seen from the preceding comments that if the procedure is preferred in which the perester and/or perketal is already added to the reaction mix at the beginning of the polymerization, the perester or the perketal must have a decomposition temperature which is sufficiently above the polymerization temperature employed, that is about 80° C., but not higher than 150° C.

The process according to the invention yields particularly good results if homopolymers of n-butyl acrylate, ethyl acrylate or methyl acrylate are maufactured.

Excellent results are obtained in carrying out the process of the present invention if the process is used to manufacture copolymers which are made up of three or more monomers, such as acrylic acid and/or methacrylic acid, as well as n-butyl acrylate and styrene. These copolymers can optionally additionally contain up to 5% by weight of acrylonitrile or acrylamide relative to the monomer content. In a preferred embodiment the percentage composition of acrylic acid or methacrylic acid relative to n-butyl acrylate and styrene is approximately:

1–7% by weight of acrylic/methacrylic acid
1–100% by weight of n-butylacrylate, and
1–55% by weight of styrene.

The use of redox systems as initiators for the polymerization of monomers in aqueous emulsion is in itself known (Houben Weyl, Makromolekulare Stoffe (Macromolecular Substances) I (1961), page 1100).

Redox systems based on potassium peroxydisulphate and sodium metabisulphite are preferred for the process according to the invention.

Carrying out emulsion polymerizations in the presence of water, emulsifiers and water-soluble redox systems at a pH value of about 2–6 and inorganic peroxy compounds is known from the literature for numerous special embodiments. In the present invention, those embodiments are particularly preferred in which an aqueous phase consisting of water and a mixture of anionic and non-ionic emulsifiers which are usually used for this purpose, is prepared and a part of the peroxidisulphate added thereto. A pre-emulsion is preapred with a part of this solution as well as the requisite monomers. A part of the sodium metabisulphite is added to the remainder of the water phase. The pre-emulsion is slowly added dropwise over the course of about 90 minutes to the reaction mix. Parallel thereto, further peroxidisulphate as well as sodium metabisulphite is added. After the end of the addition, minor amounts of peroxidisulphate as well as sodium metabisulphite are again added. The entire process is carried out under a nitrogen atmosphere and with vigorous stirring, at a pH value of 2–6 and a temperature of about 70° C. The perester and/or perketal can be added to the pre-emulsion or, after the last addition of the reducing agent in the redox system, for example sodium metabisulphite. The activator for the decomposition of the perester, for example a vanadyl salt solution, is added at the last addition of reducing agent, for example sodium metabisulphite. If the process is carried out with additional reducing agents for destroying the undecomposed perester and/or perketal after completion of the polymerization in order to improve the odor, then those reducing agents are added about 30 minutes after the last addition of the reducing agent belonging to the redox system.

As emulsifiers a particularly preferred class of polyether surfactants encompasses ethylene oxide and propylene oxide condensates in general, e.g., straight and branched-chain alkyl and alkylaryl polyethylene glycol and polypropylene glycol ethers and thioethers and more particular substances such as the "Igepals," which are members of a homologous series of alkylphenoxypoly (ethyleneoxy) ethanols, included among which are alkylphenoxypoly (ethyleneoxy) ethanols having alkyl groups containing from about 7 to 18 carbon atoms, inclusive, and having from about 4 to about 100 ethyleneoxy units, such as the heptylphenoxypoly (ethyleneoxy) ethanols, nonylphenoxypoly (ethyleneoxy) ethanols and dodecylphenoxypoly (ethyleneoxy) ethanol. Preferably nonylphenoxypoly ethanol is being used.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1.—20 g. of non-ionic emulsifier based on ethoxylated p-nonylphenols containing 30 moles of ethylene oxide, and 20 g. of dioctylsulphosuccinic acid are dissolved in 200 g. of water in a Witt pot. The reaction vessel (Witt pot) is carefully flushed with nitrogen and thus freed of atmospheric oxygen. The entire polymerization takes place under this protective gas atmosphere. 0.5 g. potassium peroxydisulphate is then dissolved in 65 ml. of water and added to the Witt pot. 50% by weight of this solution are withdrawn and described as mix I. The 50% by weight of this mixture which remain in the pot are mixed in the reaction vessel with 0.3 g. of peroxydisulphate dissolved in 35 ml. of water, as well as 0.3 g. of sodium metabisulphite dissolved in 35 ml. of water. The mixture is brought to 60° C. Mix I is treated with 220 g. of n-butyl acrylate, 190 g. of acrylic acid and 206 g. of styrene and converted to an emulsion by stirring. The pre-emulsion is added dropwise to the Witt pot over the course of about 90 minutes at 65–70° C. At the same time, 0.5 g. of sodium metasulphite dissolved in 65 ml. of water are added dropwise to the Witt pot. Fifteen minutes after completion of the addition of the pre-emulsion separate solutions of 0.15 g. of potassium peroxydisulphate dissolved in 5 g. of water and 0.15 g. of sodium metabisulphite dissolved in 5 g. of water are added 6 times, in each case at intervals of 20 minutes. Fifteen minutes after the last addition of potassium peroxydisulphate, the reaction mixture which has to a large extent polymerized completely, and in which the residual monomer content is still about 0.3 to 0.5%, by weight, is mixed with 0.5 g. of tert.-butyl perisononate as well as 1 ml. of vanadyl- p-toluenesulphonate solution in isopropyl alcohol/xylene containing 1% by weight of metal. After keeping the mixture for 90 minutes at 80° C. while stirring the residual monomer content has become negligible low, that is to say, less than 0.01% by weight. The pH value of the reaction mix was between 2 and 3.

Example 2.—It has been worked according to the above Example 1, but mix I has been produced using 220 g. n-butylmethacrylate and 206 g. styrene at a pH value of 2.5. The obtained dispersion has a residual monomer content of 0.01% by weight relative to the total monomer content employed, and no odor of acrylate can be noticed.

Example 3.—In an apparatus being described in Example 1, 10 g. of a condensation product of paranonyl phenol and 30 mols of ethyleneoxide and 5 g. of a condensation product of paranonylphenol and 4 mols of ethylene oxide and additionally 2 g. of sodium lauroylpolyglycolethersulphate are dissolved and instead of mix I the following mixture is being employed: 445 g. 2-ethylhexyl acrylate, 10 g. hydroxyethyl acrylate and 15 g. methacrylic acid and 0.5 ml. tert.-butylperoctoate. The water phase is being warmed to 60° C. At this temperature 50 g. of the above mixture are added while stirring and also 1.3 g. potassium peroxydisulphate. Then the reaction temperature is being raised slowly (in the course of 1 hour) up to 80° C. Now the continuous addition of the left amount of the above mixture is started. Parallel thereto a solution of 1.3 g. potassium peroxydisulphate in 50 ml. of water is being added.

The time of addition is 3½ hours. After that the temperature is kept at 80° C. for another hour. Half an hour after finishing the addition 1.5 ml. of 10% by weight strength solution of potassium peroxydisulphate in water is being added. 15 minutes later 0.5 g. tert.-butylperisononate and 1 ml. of a solution of vanadyl paratoluenesulphonate in isopropylalcohol/xylene (about 1% by weight of metal content) is added. After a further hour of stirring at 80° C. the residual monomer content is being decreased to below 0.01% by weight relative to the amount of monomers originally employed. The pH value used was 2.5.

A dispersion is obtained having a solid content of about 60% by weight and which does not show any odor of acrylate any more.

Example 4.—The instructions of the foregoing Example 3 are followed but the following combination of monomers is employed:

440 g. of 2-ethylhexyl acrylate,
30 g. of n-butyl acrylate,
20 g. of acrylamide and
5 g. of methacrylic acid.

A dispersion is obtained having a solid content of about 60% by weight. The content of residual monomers, lies below 0.01% by weight at a pH value of about 2. No odor of acrylic acid esters or methacrylic acid can be ascertained.

Example 5.—In a further embodiment the following mixture of monomers is being employed according to Example 3:

445 g. of 2-ethylhexyl acrylate,
30 g. of n-butyl acrylate,
10 g. of hydroxyethyl acrylate,
5 g. of methacrylamide and
10 g. acrylamide.

A dispersion is obtained having a solid content of about 60% by weight, the particle size of which lies at 0.1μ and having a viscosity of about 3,000 cp. The residual monomer content amounts to below 0.01% by weight at a pH value of 2 to 2.5.

The dispersion does not show any odor of acrylates.

Example 6.—Using the above described reaction vessel 34 g. of a condensation product of paranonylphenol and 23 mols of ethylene oxide and 10 g. of a sodium salt of the sulphate of a condensation product of paranonylphenol and 4 to 6 mols of ethylene oxide are dissolved in 600 g. of water under stirring. The following solutions are needed for the polymerization:

(A)

490 g. of ethyl acrylate,
18 g. of acrylamide,
11 g. of methacrylic acid,
57 g. of methyl methacrylate and
12 g. of a condensation product of paranonylphenol and 23 mols of ethylene oxide as well as 9 g. of deionized water and
0.5 ml. of tert.-butyl peroctoate.

(B)

4 g. of potassium peroxydisulphate,
60 g. of deionized water (C)

2 g. of sodiummetabisulphite,
60 g. of deionized water.

Inert gas atmosphere is kept in the apparatus. At room temperature 25 ml. of solution B, 60 ml. of solution A and 25 ml. of solution C are added to the water-phase. The temperature should be raised to 40–45° C. in the course of 20–30 minutes. As soon as this temperature has been reached the left over amount of solution A is being poured continuously to the reaction mixture in the course of 2 hours while being stirred.

Parallel to it the left over amount of solution B and C are added in the same course of time. 10 minutes after finishing the complete addition of the solutions A, B and C 5 ml. of tert.-butylperoctoate are added and the mixture is being stirred further 30 minutes at 70° C. After the addition of 2 ml. of hydrazine hydrate (24% by weight in water) the dispersion is being stirred further 10 minutes and cooled. At room temperature a pH value of about 6 is adjusted using diluted ammonia. The thus obtained dispersion has a solid content of about 45% by weight and a viscosity of 280 cp. The residual monomer content of acrylic acid esters and methacrylic acid esters is below 0.01% by weight. The dispersion does not show any odor of acrylic or methacrylic acid esters.

Example 7.—The instructions of the foregoing example are followed but the following monomer mixture is being employed:

100 g. of N-butoxyacrylamide,
300 g. of 2-ethylhexyl acrylate,
5 g. of acrylic acid and
95 g. of styrene.

The obtained dispersion has a solid content of about 60% by weight and the content of residual monomers is below 0.01% by weight at a pH value of about 2. The dispersion does not show an odor of acrylates.

Example 8.—20 g. of a non-ionic emulsifier based on the ethoxylated p-nonylphenol containing 30 mols of ethylene oxide, and 20 g. of dioctylsulphosuccinic acid are dissolved in 200 g. of water in a Witt pot. The reaction vessel (Witt pot) is carefully flushed with nitrogen and thus freed of atmospheric oxygen. The entire polymerization takes place under this protective gas atmosphere. 0.5 g. of potassium peroxydisulphate is then dissolved in 65 ml. of water and added to the Witt pot. 50% by weight of this solution are withdrawn and described as mix I. The 50% by weight of this mixture which remain in the pot are mixed in the reaction vessel with 0.3 g. of peroxydisulphate dissolved in 35 ml. of water, as well as 0.3 g. of sodium metabisulphite dissolved in 35 ml. of water. The mixture is brought to 60° C. Mix I is treated with 220 g. of n-butyl acrylate, 16 g. of acrylic acid and 190 g. of styrene and converted to an emulsion by stirring. This pre-emulsion is added dropwise to the Witt pot over the course of about 90 minutes at 65–70° C. At the same time, 0.5 g. of sodium metabisulphite dissolved in 65 ml. of water are added dropwise to the Witt pot. Fifteen minutes after completion of the addition of the pre-emulsion separate solutions of 0.15 g. of potassium peroxydisulphate dissolved in 5 g. of water and 0.15 g. of sodium metabisulphite dissolved in 5 g. of water are added 6 times, in each case at intervals of 20 minutes. Fifteen minutes after the last addition of potassium peroxydisulphate, the reaction mixture which has to a large extent polymerized completely, and in which the residual monomer content is still about 0.3 to 0.5% by weight is mixed with 0.5 g. of tert.-butyl perisononate as well as 1 ml. of vanadyl-p-toluenesulphonate solution in isopropyl alcohol/xylene containing 1% by weight of metal. After keeping the mixture for 90 minutes at 80° C. while stirring, the residual monomer content has become negligibly low, that is to say, less than 0.01% by weight.

Example 9.—The procedure of Example 8 is followed but 30 minutes after the addition of the vanadyl salt solution 1 g. of a 25% strength by weight of aqueous hydrazine solution is added and the mixture kept at 80° C. Ninety minutes after this addition, the residual monomer content has fallen to below 0.01% by weight and the unconsumed tert.-butyl perisononate has been reduceed.

Example 10.—The procedure of Example 8 is followed, but instead of tert.-butyl perisononate, tert.-butyl peroctoate is new used. Here again the residual monomer content is now less than 0.01% by weight.

Example 11.—The procedure of Example 9 is followed, but instead of tert.-butyl perisononate, tert.-butyl peroctoate is used. The residual monomers are now completely polymerized and the tert.-butyl peroctoate destroyed.

Example 12.—The procedure of Example 8 is followed; instead of tert.-butyl perisononate, mono-tert.-butyl permaleate is now used. The residual monomer content is thus reduced to below 0.01% by weight.

Example 13.—The procedure of Example 8 is followed, but with the difference that the 0.5 g. of tert.-butyl perisononate are added to the pre-emulsion which is run in. After completion of the addition of the pre-emulsion, the appropriate vanadyl salt solution is added. After keeping the mixture at 75–80° C. for 90 minutes while stirring, the residual monomer content is negligibly small, below 0.01% by weight.

Example 14.—The procedure specified in Example 13 is followed. Instead of tert.-butyl perisononate, the same amount of tert.-butyl peroctoate is used. The percentage content of non-polymerized monomers is less than 0.01% by weight.

Example 15.—The procedure of Example 13 is followed. Instead of tert.-butyl perisononate, tert.-butyl peracetate is employed. The residual monomer content thus falls to below 0.01% by weight.

Example 16.—The procedure of Example 13 is followed, but instead of tert.-butyl perisononate, tert.-butyl perbenzoate is employed. In this case again the residual monomer content is further polymerized down to an amount of less than 0.01% by weight.

Example 17.—The procedure of Example 13 is followed, but instead of tert.-butyl perisononate, a cyclic perketal of formula:

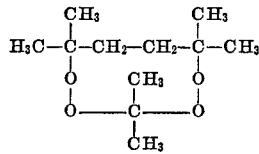

is employed. The content of unpolymerized monomers is now merely less than 0.01% by weight.

Example 18.—The procedure described in Example 13 is followed, but after adding sodium metabisulphite, 1 g. of 25% strength by weight hydrazine hydrate solution is added. After waiting for 90 minutes at 75–80° C., the residual monomer content is less than 0.01% by weight and the unconsumed tert.-butyl perisononate has disappeared.

Example 19.—The procedure of Example 18 is followed, but instead of tert.-butyl perisononate, tert.-butyl peroctoate is employed. The residual monomer content is now less than 0.01% by weight and the tert.-butyl peroctoate has been completely reduced.

Example 20.—The procedure described in Example 18 is followed, but instead of tert.-butyl perisononate, tert.-butyl peracetate is used. The residual monomer content is now less than 0.01% by weight and the tert.-butyl peracetate has been destroyed.

Example 21.—The procedure described in Example 18 is employed. The tert.-butyl perisononate is here replaced by tert.-butyl perbenzoate. The unpolymerized proportion of monomer is now less than 0.01% by weight and the tert.-butyl perbenzoate has been reduced.

Example 22.—The procedure described in Example 18 is followed. Instead of the tert.-butyl perisononate, a cyclic perketal, being described in Example 17, is employed. The residual monomer content was thereby reduced to below 0.01% by weight and the excess cyclic perketal was destroyed by reduction.

Example 23.—The procedure of Example 13 is followed, but instead of 0.5 g. of tert.-butyl perisononate, a mixture consisting of 0.25 g. of tert.-butyl perisononate and 0.25 g. of a cyclic perketal of the formula given in Example 22 is used. The residual monomer content is thereby reduced to below 0.01% by weight.

Example 24.—The procedure of Example 9 is followed, but instead of the monomer mixture used therein, in individual monomer, namely 400 g. of n-butyl acrylate, is used to manufacture a homopolymer. The residual monomer content of n-butyl acrylate has fallen to below 0.01% by weight after completion of the process.

Example 25.—The procedure of Example 8 is followed, but instead of the monomer mixture used therein, a different monomer mixture, consisting of 200 g. of ethyl acrylate, 200 g. of styrene and 20 g. of acrylic acid, is used to manufacture a polymer. The residual monomer content is again less than 0.01% by weight.

Example 26.—The procedure of Example 25 is followed, but the ethyl acrylate in the monomer mixture is replaced by methyl acrylate. Here again the residual monomer content is less than 0.01% by weight.

Example 27.—The procedure of Example 9 is followed, but a mixture consisting of 200 g. of n-butyl acrylate, 180 g. of styrene, 20 g. of acrylamide and 20 g. of acrylic acid is employed. The residual monomer content of each individual component is less than 0.01% by weight.

Example 28.—The procedure specified in Example 27 is followed, but the acrylamide in the monomer mixture is replaced by 20 g. of acrylonitrile. The residual monomer content of each individual component is less than 0.01% by weight.

Example 29.—The procedure described in Example 9 is followed. However, a mixture consisting of 190 g. of n-butyl acrylate, 190 g. of methyl acrylate and 20 g. of methacrylic acid is used as the monomer. The residual monomer content after completion of the process is less than 0.01% by weight for each individual component.

Example 30.—The procedure of Example 9 is followed, but 16 g. of methacrylic acid are used in the monomer mixture in place of 16 g. of acrylic acid. The residual monomer content drops to below 0.01% by weight.

COMPARISON TEST TO DEMONSTRATE THE ADVANCE OVER THE PRIOR ART

Series 1

A dispersion has been produced according to the Example II of the U.S. Pat. 3,423,353. The dispersion obtained in this manner has a content of residual monomers of 1.06% by weight of vinylacetate and 1.18% by weight of ethylacrylate and odor of acrylate was detestable. Further on a mix has been produced according to the same example but 0.5 g. tert.-butyl-perisononate was added to the mixture of monomers according to this invention. A dispersion was obtained having a solid content of 63% by weight and a viscosity of 210 cp. The residual monomer content was 0.1% by weight of vinyl acetate and 0.01% by weight of ethylacrylate at a pH value of 2.5. The obtained dispersion shows no odor of acrylate in contrast to that obtained by Example II of the U.S. Pat. 3,423,353.

Series 2

In order to demonstrate the advance over the prior art, comparison polymerization were carried out in accordance with the known procedure. Here the procedure described in Example 13 was followed, but the perester was in each case replaced by the equivalent quantity of the peroxides specified, or of azoisobutyric acid dinitrile. As shown in the table below, it was not possible in any case to completely polymerize the residual monomer content.

TABLE I

| Initiator added | Percent by weight of remaining residual monomer | |
| --- | --- | --- |
| | Butyl acrylate | Styrene |
| 2,2'-azo-diisobutyric acid dinitrile | 0.21 | 0.29 |
| Tert.-butyl hydroperoxide | 0.18 | 0.1 |
| Diisopropylbenzene monohydroperoxide | 0.19 | 0.18 |
| 2,2'-bis(tert.-butylperoxy)-butane | 0.12 | 0.13 |
| Lauroyl peroxide | 0.12 | 0.1 |
| Methyl ethyl ketone peroxide | 0.28 | 0.23 |
| 2,4-dichlorobenzoyl peroxide | 0.1 | 0.31 |
| Methyl isobutyl ketone peroxide | 0.17 | 0.18 |
| Cumene hydroperoxide | 0.22 | 0.5 |
| Peracetic acid | 0.34 | 0.29 |
| Benzoyl peroxide | 0.26 | 0.45 |
| p-Menthane hydroperoxide | 0.19 | 0.32 |
| Diacetyl peroxide | 0.19 | 0.31 |
| Cyclohexanone peroxide | 0.13 | 0.22 |
| Butyl amyl peroxide | 0.1 | 0.17 |
| Perlauric acid | 0.37 | 0.48 |

All the dispersions possess a strong, unpleasant, penetrating odor. A comparison series was carried out in accordance with Example 9, but the perester is replaced by the equivalent quantity of the peroxides specified. The result is given in the table below:

TABLE II

| nitiator added | Percent by weight of remaining residual monomer | |
| --- | --- | --- |
| | Butyl acrylate | Styrene |
| Tert.-butyl hydroperoxide | 0.28 | 0.30 |
| Lauroyl peroxide | 0.24 | 0.21 |
| Methyl ethyl ketone Peroxide | 0.31 | 0.24 |
| Cumene hydroperoxide | 0.37 | 0.72 |
| Peracetic acid | 0.42 | 0.34 |
| Benzoyl peroxide | 0.31 | 0.41 |
| Cyclohexanone peroxide | 0.21 | 0.29 |

As can be seen from the above comparison investigations and the relevant examples of the present invention, it is not possible to practically remove the residual monomer completely by the known processes.

All the percentages quoted in the examples are percentages by weight.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. Process for the production of an aqueous dispersion of homopolymers or copolymers which contain at least one compound selected from the group consisting of acrylic acid, methacrylic acid, acrylic acid esters, methacrylic acid esters, acrylamide, acrylonitrile, methacrylamide, methacrylonitrile, or mixtures thereof, by emulsion polymerization of the monomers in a first step at a pH value of about 2 to 6 and including at least one monomer selected from the group consisting of acrylic acid, methacrylic acid, acrylic acid esters and methacrylic acid esters in the presence of a water-soluble, inorganic peroxy compounds containing redox system, the improvement comprising in a second step the addition to the polymerization mixture of 0.1 to 3 percent by weight based upon total monomer content of a treating agent when the amount of free monomer in said mixture has fallen to a substantially constant level, which treating agent has a decomposition temperature of 30° to 150° C. and is selected from the group consisting of carboxylic acid esters having the general formula

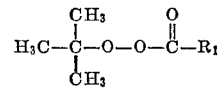

wherein $R_1$ is an alkyl group with 1 to 9 carbon atoms such as -methyl, -ethyl, -n-propyl, -isopropyl, -n-butyl, -isobutyl, -pentyl, -hexyl, -heptyl, -octyl, -nonyl or an aromatic radical such as

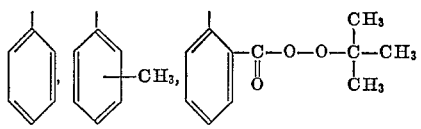

or a carboxylic acid radical, such as

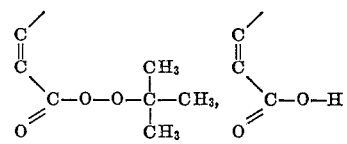

and perketals having the formula

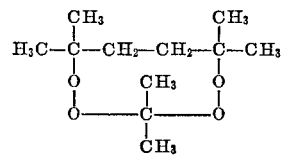

and mixtures of such carboxylic acid esters and perketals and heating the mixture to the decomposition temperature of the treating agent to reduce the residual monomer content below 0.01 percent.

2. The process of claim 1, including the addition to the reaction mixture after substantial completion of the polymerization of a reducing agent selected from the group consisting of hydrazine hydrate, the salts of hydrazine hydrate, hydroxylamine, hydroxylamine salts, gaseous sulfur dioxide, water-soluble salts of sulfur dioxide and inorganic salts of nitrous acid in acid solution.

3. Process for the production of an aqueous dispersion of homopolymers or copolymers which contain at least one compound selected from the group consisting of acrylic acid, methacrylic acid, acrylic acid esters, methacrylic acid esters, acrylamide, acrylonitrile, methacrylamide, methacrylonitrile, or mixtures thereof, by emulsion polymerization of the monomers at a pH value of about 2 to 6 and including at least one monomer selected from the group consisting of acrylic acid, methacrylic acid acrylic acid esters and methacrylic acid esters in the presence of a wtaer-soluble, inorganic peroxy compounds containing redox system, the improvement comprising the addition to the polymerization mixture of 0.1 to 3 percent by weight based upon total monomer content of a treating agent prior to the polymerization, which treating agent has a decomposition temperature of 30° to 150° C. and is selected from the group consisting of carboxylic acid esters having the general formula

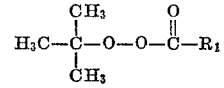

wherein $R_1$ is an alkyl group with 1 to 9 carbon atoms such as -methyl, -ethyl, -n-propyl, -isopropyl, -n-butyl, -isobutyl, -pentyl, -hexyl, -heptyl, -octyl, -nonyl or an aromatic radical such as

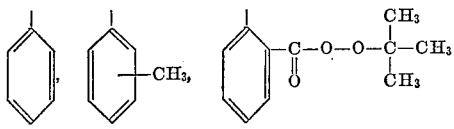

or a carboxylic acid radical, such as

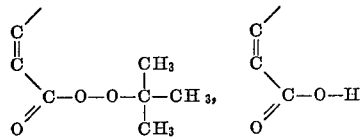

and perketals having the formula

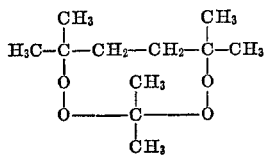

and mixtures of such carboxylic acid esters and perketals and the polymerization is carried out in a final step below the decomposition temperature of the treating agent until the amount of free monomer in said mixture has fallen to a substantially constant level, and heating in a second step the mixture to the decomposition temperature of the treating agent to reduce the residual monomer content below 0.01 percent.

References Cited

UNITED STATES PATENTS 3,423,353  1/1969  Levine et al.

OTHER REFERENCES

Kirk-Othmer, Encycl. Polym. Technol. 9, 833–34 (1968).

MELVIN GOLDSTEIN, Primary Examiner

U.S. Cl. X.R.

260—29.6 T, TA, H